US011959599B2

(12) United States Patent
Li

(10) Patent No.: US 11,959,599 B2
(45) Date of Patent: Apr. 16, 2024

(54) LIGHTING SYSTEM AND LUMINAIRE FOR SIMULATING SUNNY SKY SCENES AND METHOD FOR MAKING THE LIGHTING SYSTEM

(71) Applicant: Wei Li, Tampere (FI)

(72) Inventor: Wei Li, Tampere (FI)

( * ) Notice: Subject to any disclaimer, the term of this patent is extended or adjusted under 35 U.S.C. 154(b) by 0 days.

(21) Appl. No.: 17/668,891

(22) Filed: Feb. 10, 2022

(65) Prior Publication Data

US 2022/0252233 A1 Aug. 11, 2022

Related U.S. Application Data

(60) Provisional application No. 63/147,772, filed on Feb. 10, 2021.

(51) Int. Cl.

| | |
|---|---|
| ***F21S 10/00*** | (2006.01) |
| ***F21V 5/00*** | (2018.01) |
| ***F21Y 113/10*** | (2016.01) |
| ***F21Y 115/10*** | (2016.01) |

(52) U.S. Cl.

CPC .............. *F21S 10/005* (2013.01); *F21V 5/00* (2013.01); *F21Y 2113/10* (2016.08); *F21Y 2115/10* (2016.08)

(58) Field of Classification Search

CPC ............ F21S 10/005; F21S 8/006; F21V 5/00
See application file for complete search history.

(56) References Cited

U.S. PATENT DOCUMENTS

| | | | |
|---|---|---|---|
| 2012/0320626 A1 | 12/2012 | Quilici et al. | |
| 2014/0254155 A1 | 9/2014 | Higashi et al. | |
| 2016/0052446 A1 | 2/2016 | Frey | |
| 2016/0363710 A1 | 12/2016 | Van Boven et al. | |
| 2018/0252374 A1 | 9/2018 | Keller et al. | |
| 2022/0026052 A1* | 1/2022 | Keller .................. | G02B 6/0095 |

FOREIGN PATENT DOCUMENTS

| | | |
|---|---|---|
| EP | 2778514 A | 9/2014 |
| JP | 2014026841 A | 2/2014 |
| WO | 2016166044 A1 | 10/2016 |

OTHER PUBLICATIONS

US 11,022,729 B2, 06/2021, Schill et al. (withdrawn)
Search reports in corresponding Finnish patent application 20207120 dated Oct. 9, 2020 (pp. 1-2).
English Machine Translation for JP-2014026841, Publication Date: Feb. 6, 2014.

* cited by examiner

*Primary Examiner* — Karabi Guharay
(74) *Attorney, Agent, or Firm* — Millen, White, Zelano & Branigan P.C.; William F. Nixon

(57) ABSTRACT

An optical element, a lighting system, and a LED luminaire simulate natural sunlight for a space, such as an indoor room. The optical element is disposed in front of a tunable white light source and includes unique microstructures, which when used with the tunable white light source, produces an appearance of the sun. The lighting system comprises the optical element, the tunable white light source assembling the sun and a color tunable light emitting panel assembling a sky. The luminaire incudes the lighting system, a driver, and a controlling device for simulating sunny sky scenes throughout the day.

10 Claims, 12 Drawing Sheets

LIGHTING SYSTEM AND LUMINAIRE FOR SIMULATING SUNNY SKY SCENES AND METHOD FOR MAKING THE LIGHTING SYSTEM

FIELD OF THE INVENTION

The invention relates to an optical element, a lighting system and a luminaire which can simulate sunny sky scenes at different times of the day and year and provide similar health benefits of a natural light, in both visual and non-visual effects. More particularly, the present invention relates to a method for manufacturing the optical element, the lighting system, and the luminaire.

DESCRIPTION OF THE RELATED ART

Natural light is essential for human beings and is fundamental for life. It has an equal importance as water and air. The presence or lack of the natural light would not only affects circadian rhythms, but also affects humans visually, emotionally and biologically (e.g., a visual cortex, the whole of alertness, wellbeing and performance). Human circadian rhythm and seasonal variation are genetically fixed, but they are regulated to a certain extent by our surroundings, above all, by light.

The daylight color temperature and light level in fact change from dawn to dusk and the human beings' circadian cycle follows this change closely. Multiple physiological processes—including those relating to alertness, metabolism and sleep—are regulated in part by the variance and interplay of hormones involved in this cycle. Recent reports on lighting for human health and well-being have shown clearly that natural light has strong effect on mood (depression & anxiety), stress and energy level.

Given that modern people spend much of their waking day (about 90% of their time) indoors or there might be a lack of available bright sunlight in cloudy days or during winter, most of them receive too little sunlight exposure during daytime, and too much artificial light (blue light) in the evening. On the other hand, too much UV exposure from the sun outdoors can increase risk of skin cancers and eye disease.

Recently, human-centric lighting devices that provide a light close to the natural sunlight at offices and homes have proved to benefit a better health, brighter moods, sharper focus, and heightened alertness/productivity for people who are exposed in such lighting devices. A sunlight spectrum may have wavelengths between 400 nm to 1400 nm, as shown FIG. 11. Studies show that a luminaire with a spectra and light level similar to the sunlight spectrum can improve human productivity, general health, and well-being.

For example, light in the blue range of the spectrum helps human body tell time and stay aligned with circadian rhythms (the natural 24-hour cycle of sleeping and waking). Soft, dim light helps spur creativity, while brighter lights can lift up the mood and the ability to focus, even to the extent of shortening depression-related hospitalizations. To maintain optimal, properly synchronized circadian rhythms, human body requires periods of both brightness and darkness, and lighting patterns that protect circadian rhythms, and an emphasis on color quality (i.e., more blue light during the day, less blue light and more red light during the night), not just on brightness.

As known from the prior art, light therapy lamps typically comprise a static white or blue light source. Tunable white light lamp or luminaires generally lack some key characteristics of natural light, such as intensity and visual effects of the sun and sky. U.S. Patent Publication No. US2014/0133125A1 discloses a specific luminaire design to provides blue sky experience, which has a complicated structure, and lack dynamic tunable light. U.S. Pat. No. 9,476,567B2 (now U.S. Pat. No. 6,396,787) relates to optical elements and a lighting system to create a skylight appearance, while it still lacks dynamic tunable light.

Accordingly, to achieve better benefit of natural light, it is desirable to design a lighting system having a capability of tuning a color temperature of light dynamically.

SUMMARY OF THE INVENTION

A lighting system for simulating sunny sky scenes is disclosed. The lighting system comprises a color-tunable light emitting panel resembling a sky, a tunable white light engine resembling a sun that is positioned inside an aperture in the color-tunable light emitting panel, and an optical element positioned in front of the tunable white light engine. The color-tunable light emitting panel can be an edge-lit type or a back-lit type or organic light emitting diode (OLED) panel. The tunable white light engine comprises an array of LEDs with different color temperature. The optical element comprises a microstructure formed on top of or in a transparent substrate or substrates to provide the appearance of the sun.

The array of LEDs of the tunable white light engine arranged inside an optical cavity forms a tunable white light source. The tunable white light source has adjustable color temperature of the white light output in the range from 1900 K to 6500 K and a spectral range of the white light output is between 400 nm and 1400 nm.

An optical element is also disclosed. The optical element includes an inner region and an outer region, and microstructures consisted of a plurality of dots are formed on a transparent substrate or substrates on a top of the optical element covering the inner and outer regions. The plurality of dots are arranged on the inner region in a random distribution, and are arranged on the outer region in rows and columns separated by constant pitches. In operation, the optical element is located in front of a tunable white light source and functions as a light emitting surface. The plurality of dots formed on the inner region facilitates a uniform light distribution emitted from the tunable white light source. The plurality of dots on the outer region form two-dimensional gratings. With the unique-designed microstructures, the optical element provides an appearance of the sun.

Alternatively, the tunable white light engine may comprises multiple controllable channels of light emitters arranged inside an optical cavity to produce light such that the tunable white light source has adjustable color temperature of the white light output in the range from 1900 K to 6500 K and a spectral range of the white light output is between 400 nm and 1400 nm.

Another lighting system for simulating sunny sky scenes is disclosed. The lighting system comprises a color-tunable light emitting panel, a tunable white light engine, positioned inside the light emitting panel, resembling the sun. The tunable white light engine includes an array of LEDs with different color temperature. The color-tunable light emitting panel is an edge-lit type light emitting panel. The color-tunable light emitting panel comprises a plurality of multi-colored light emitting diodes (LEDs) arranged on edges of a light-guide, in which light is emitted from a front surface of the light-guide through an out-coupling structure. The lighting system further includes a diffuser adjacent to the front surface of the light-guide for transmitting diffusing light out of the panel.

The color-tunable light emitting panel can also be a back-lit light emitting panel. In this case, the lighting system comprises a diffuser as a light emitting surface and a plurality of multi-colored LEDs arranged behind the diffuser. The plurality of multi-colored LEDs are RGB or RGBA or RGBW light emitting diodes, and can be individually varied in output to create the desired color, intensity and pattern A luminaire for simulating sunny sky scenes throughout a day that comprises a light system as described above is also disclosed. The luminaire further includes a driver for driving the array of light emitters of the tunable white light engine and the color-tunable light emitting panel. The driver is connected to a computer for controlling and coordinating relative illumination output for the lighting system.

A method for simulating sunny sky scenes throughout a day is further disclosed. The method comprises providing a color-tunable light emitting panel resembling the sky with a light engine, wherein a plurality of first multi-color LEDs are disposed an edge-lit type or a back-lit type, producing sunlight with a tunable white light engine positioned relative to the color-tunable light emitting panel, and providing the appearance of the sun using an optical element coupled to a front of the tunable white light engine.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments provide lighting systems to provide simulated natural sunlight in rooms, offices, and other indoors locations. As natural sunlight is essential for human beings as it provides important benefits to human's physical and mental health. Thus, an indoor lighting systems according to the disclosed embodiments are important for those who do not go outdoors much because of their work or life styles, or those who live at regions where the day is shorter or the climates do not get enough sunlight. According to the disclosed embodiment, the color temperature and intensity of the light of the lighting system may vary based on the time of a day of a year or the geographic locations according to settings selected by users. For example, a user may program the lighting system functioning like a natural sun at a tropical place, even he/she actually lives at a high latitude place.

Figure 1:
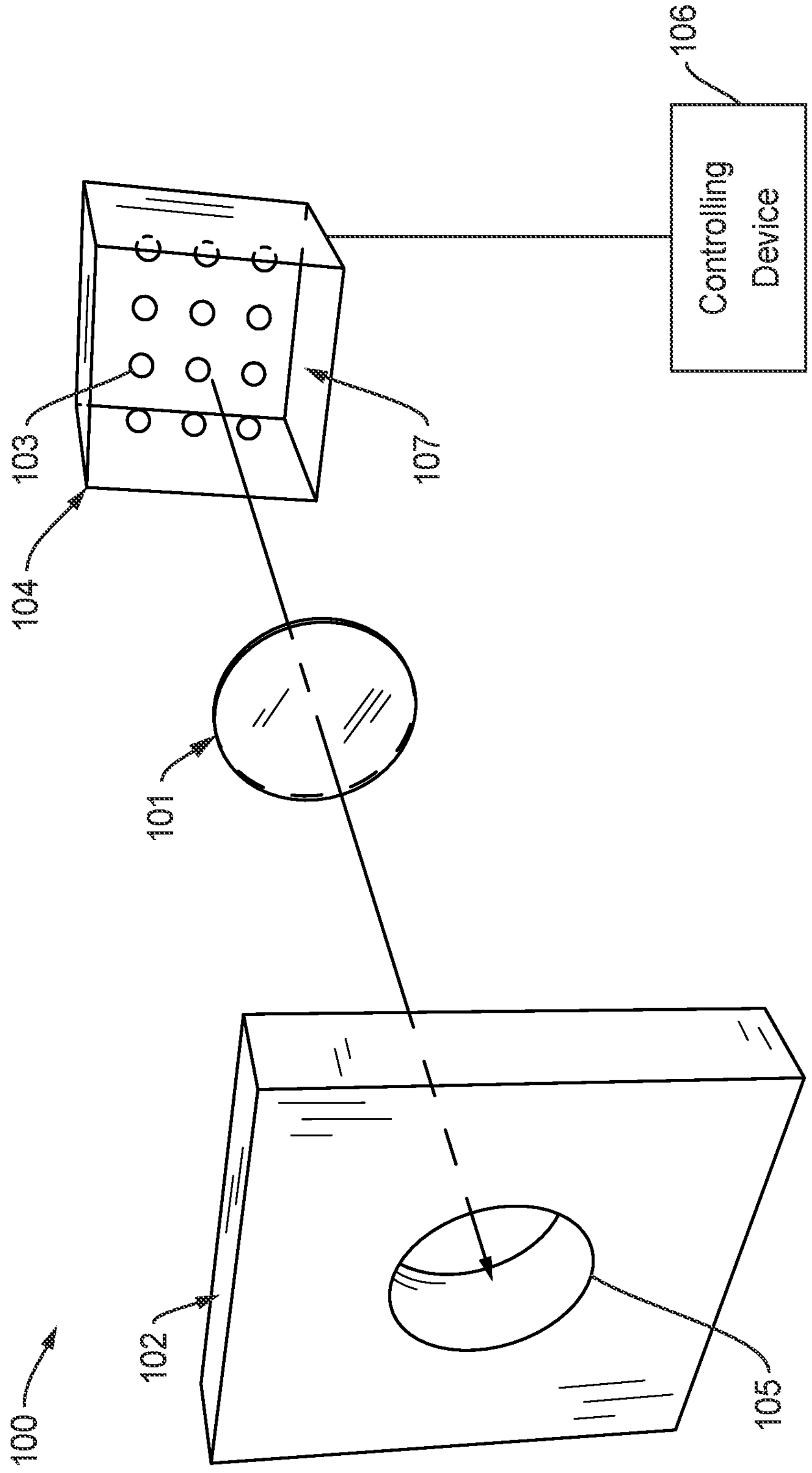
FIG. 1 illustrates a schematic diagram of an exemplary lighting system in accordance with the disclosed embodiments.

In addition, the lighting systems and luminaire according to the disclosed embodiments are able to reproduce natural light without any harmful ultraviolet radiation and to simulate a sunny sky scene throughout the day, including both visual and non-visual effects, which allows users to perceive sunny sky scenes indoors with a sense of connection to nature and feel happy and stay healthy FIG. 1 illustrates an exemplary lighting system in accordance with the disclosed embodiments. In FIG. 1, lighting system 100 comprises a color-tunable light emitting panel 102 resembling a sky, a tunable white light engine 104 resembling a sun, and a controlling device 106 for controlling light engine 104 and light emitting panel 102. Color-tunable light emitting panel 102 may be an edge-lit or a back-lit type of light emitting panel or an organic light-emitting diodes (OLEDs) panel. Light engine 104 includes at least one light source 103 comprising a plurality of light emitting diodes (LEDs) arranged in an optical cavity 107 of light engine 104. Lighting system 100 further includes an optical element 101 that is arranged in front of light engine 104.

Color-tunable light emitting panel 102 is an edge-lit or a back-lit light emitting panel, and has an aperture 105. Tunable white light engine 104 may be attached to aperture 105 or inserted in aperture 105. Controlling device 106 may be a computing device that controls the light emitters to create a desired color, intensity and pattern to simulate the properties of the sunlight at a time of a day of a year.

Optical element 101 includes a microstructure formed on a top of or in a transparent substrate or substrates to provide the appearance of the sun. In accordance with the disclosed embodiments, optical element 101 may be attached on a front surface of light engine 104. In an alternative embodiment, optical element 101 may be attached on a front surface of color-tunable light emitting panel 102 instead or on both of light engine 104 and light emitting panel 102. Optical element 101 functions as a diffuser to diffuse a light emitted from light source 103.

Details of light emitting panel 102, light engine 104, optical element 101, controlling device 106, and their relationships will be disclosed below with reference to FIGS. 2-9.

Further disclosed by FIG. 1, light emitting panel 102, light engine 104, optical element 101, and the controlling device 106 are shown as separate elements, however, the disclosed embodiments are not limited to such a combination. For example, light engine 104 may be inserted inside aperture 105 of light emitting panel 102 or mounted surrounding aperture 105. Light engine 104 and controlling device 106 may be included in a same unit. A single diffuser, such as optical element 101 may be formed on a top of light emitting panel 102. Controlling device 106 may be a separate element that can be wirelessly and remotely connected with light engine 104 and light emitting panel 102 and does not form a part of lighting system 100. Any combinations of these elements that construes a lighting system and a luminaire capable of not only reproducing natural light, but also simulating sunny sky scenes throughout the day, including both visual and non-visual effects, are included in the disclosed embodiments.

Figure 2:
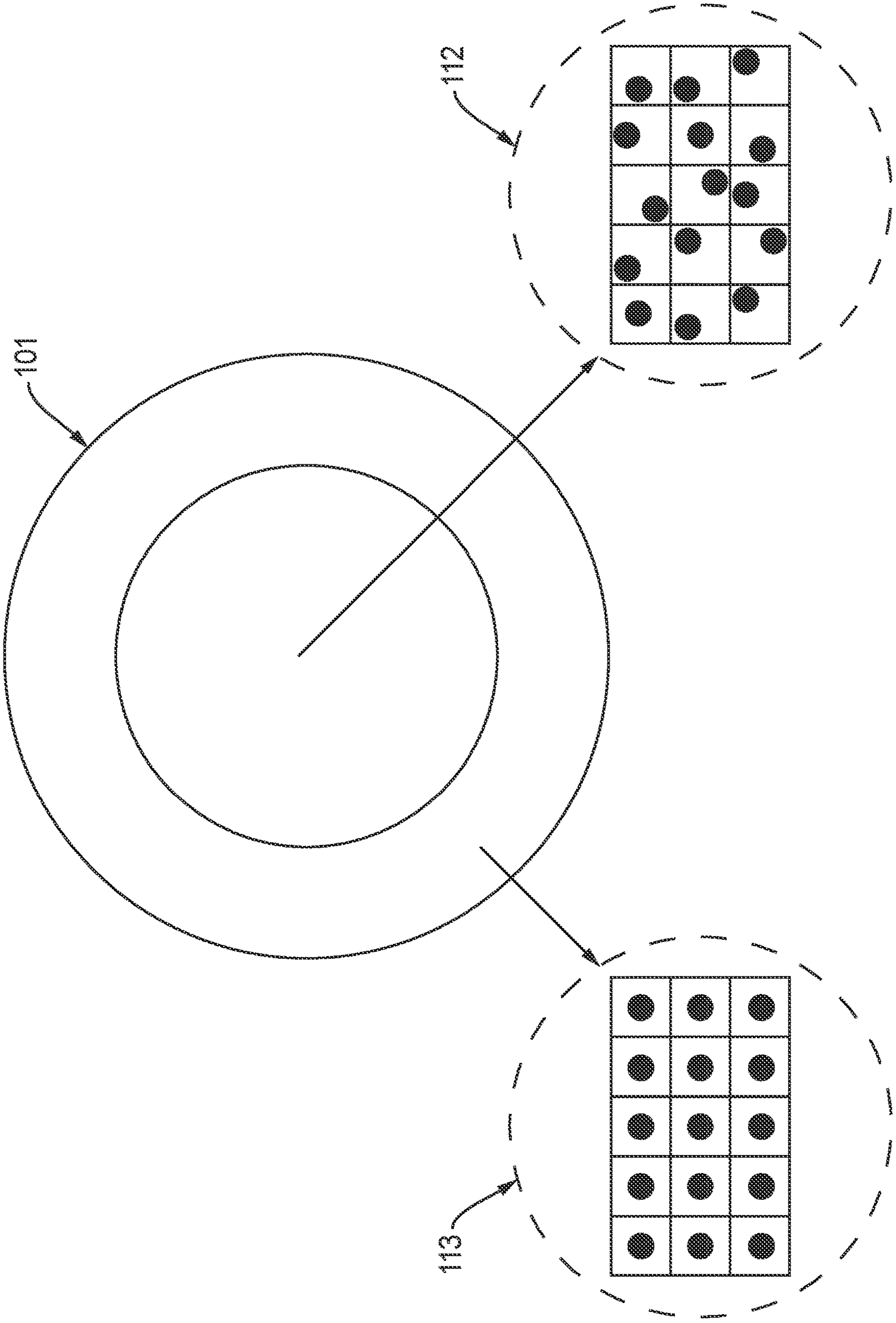
FIG. 2 illustrates a schematic diagram of an optical element in accordance with the disclosed embodiment.

FIG. 2 schematically illustrates a structure of optical element 101 according to the disclosed embodiments. Optical element 101 may be in a form of a transparent film or a transparent substrate made from glass, polycarbonate, etc., and includes a microstructure on a top thereof. As described in FIG. 1, optical element 101 may be configured in front of tunable white light engine 104 and forms a light emitting surface. Light source 103 inside light engine 104 emits light toward optical element 101.

Optical element 101 includes an inner region or a center region 112 and an outer region or edge region 113. Both inner region 112 and outer region 113 have dot patterns formed thereon. The dot-pattern of inner region 112 acts as a diffuser to obtain a uniform light emission and to prevent hot spots from being visible to viewers. The dots on outer region 113 form two-dimensional gratings to diffract light that are used to simulate the visual effects of the sun.

The microstructure (dot-pattern) can be imprinted on top of the transparent (to visible light) substrates or film. The total domain of the microstructure can be divided into a given number of individual cells, and each cell contains one or several dots. Each dot has an equal radius and the radius is in a range of several nanometers to hundreds of microns. The dot pattern on inner region 112 is distributed randomly in a two-dimensional manner so that the light emitted from the light source of light engine 104 can be uniformly distributed across the light emitting surface. In outer areas 113, the dots are aligned in rows and columns separated by constant pitches acting as two-dimensional gratings to provide the appearance of the sun.

Alternatively, the microstructures of optical element 101 may be molded on the substrate itself, for example, a plurality of periodic holes fabricated through the substrate in outer areas 113. Other type of microstructures based on the similar design can be also implemented without limitations. Also, optical element 101 may be preferably in a shape of a circle to represent the shape of the sun. However, other shapes are also applicable as long as the plurality of dots formed on the surface of optical element 101 are well arranged to simulate the sun.

Figure 3A:
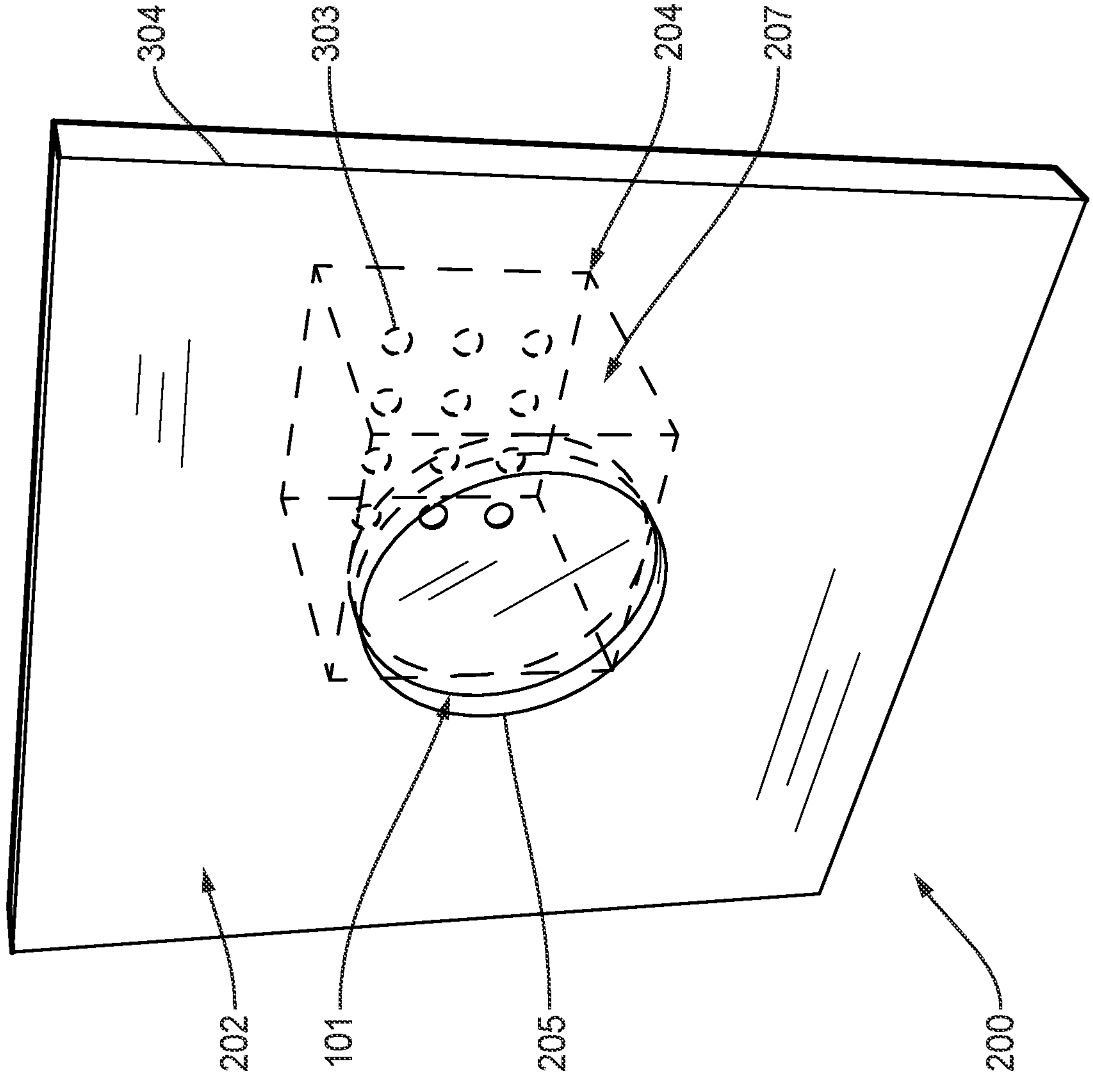
FIG. 3A illustrates a schematic diagram of a lighting system according to the disclosed embodiment which shows a front view of a color-tunable light emitting panel and an optical element.
Figure 3B:
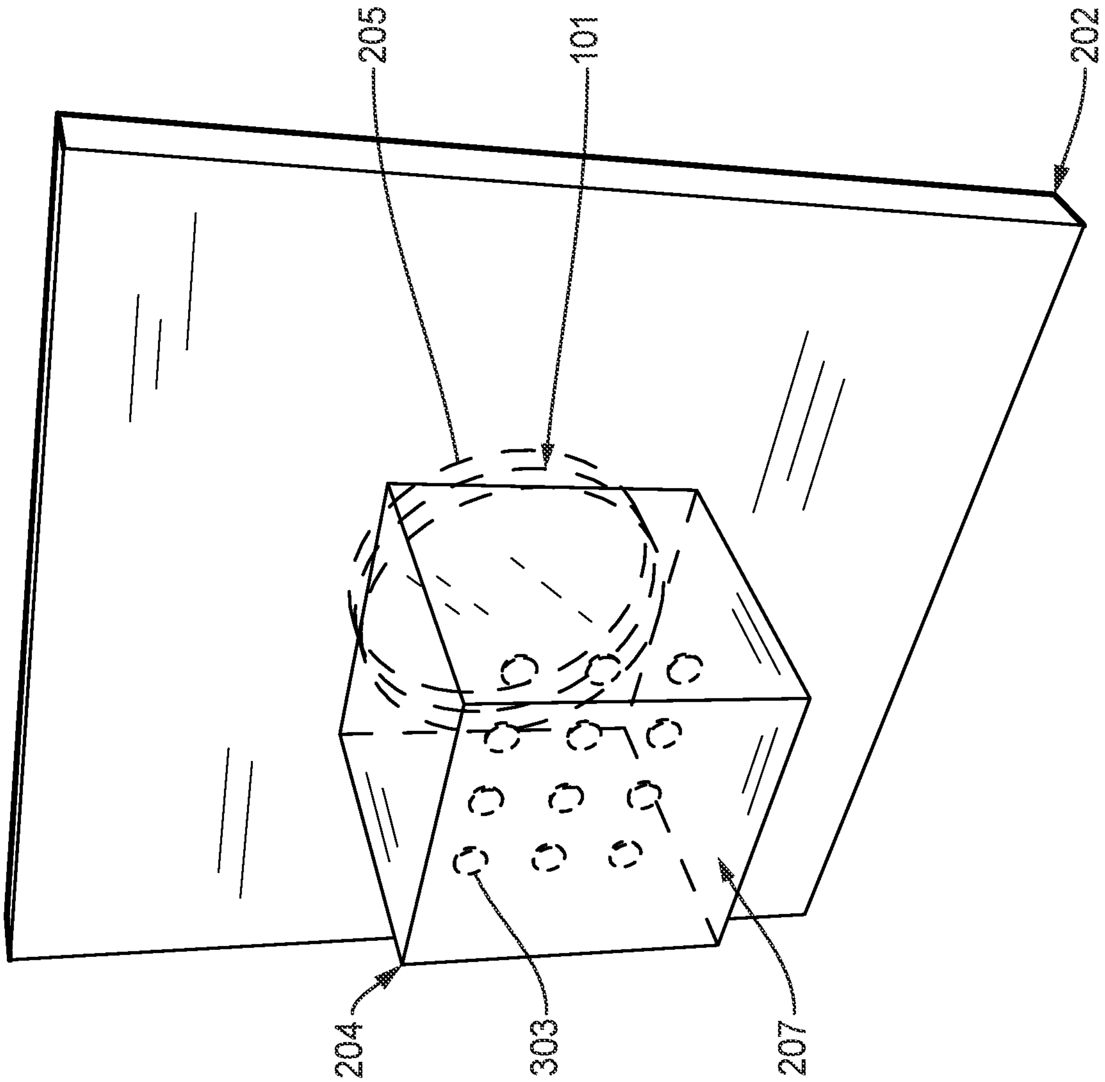
FIG. 3B illustrates a schematic diagram of a lighting system according to the disclosed embodiment which shows a tunable white light engine is positioned inside an aperture in the color-tunable light emitting panel.

FIGS. 3A and 3B are schematic diagrams of a lighting system 200 according to the disclosed embodiment. FIG. 3A illustrates a schematic diagram of lighting system 200 showing a front view of a color-tunable light emitting panel 202. FIG. 3B illustrates a schematic diagram of the lighting system 200 showing a tunable white light engine 204 attached to a back of the color-tunable light emitting panel 202.

Tunable white light engine 204 has a structure similar to light engine 104 of FIG. 1 and includes at least one light source 303, comprising one or more array of LEDs 303 arranged in an optical cavity 207 of light engine 204. As described above, light engine 204 may be inserted into an aperture 205 of light emitting panel 202 or mounted to a surrounding of aperture, as shown in FIG. 3B. Aperture 205 is located on the back of light emitting panel 202. Aperture 205 maybe a through hole or a one-end opened hole.

Color-tunable light emitting panel 202 may be an edge-lit light-guide style panel or a back-lit style panel and comprises a plurality of light emitting diodes (LEDs) located on edges of a light-guide or on the back of a diffuser sheet. Examples of edge-lit light emitting panel 202 can be found in FIGS. 4-6 and examples of back-lit light emitting panel 202 can be found in FIGS. 7-8. For exemplary purposes, light emitting panel 202 of FIGS. 3A and 3B is an edge-lit panel, in which the plurality of LEDs is located on edges of the light-guide.

Although not shown in FIGS. 3A and 3B, an optical element 101 with a microstructure as shown in FIG. 2 is located in front of light engine 204. As mentioned before, optical element 101 may be attached to a front surface of light engine 204, or a front surface of light emitting panel 202. Various designs according to the disclosed embodiments will be described below with reference to FIGS. 4-10.

Figure 4:
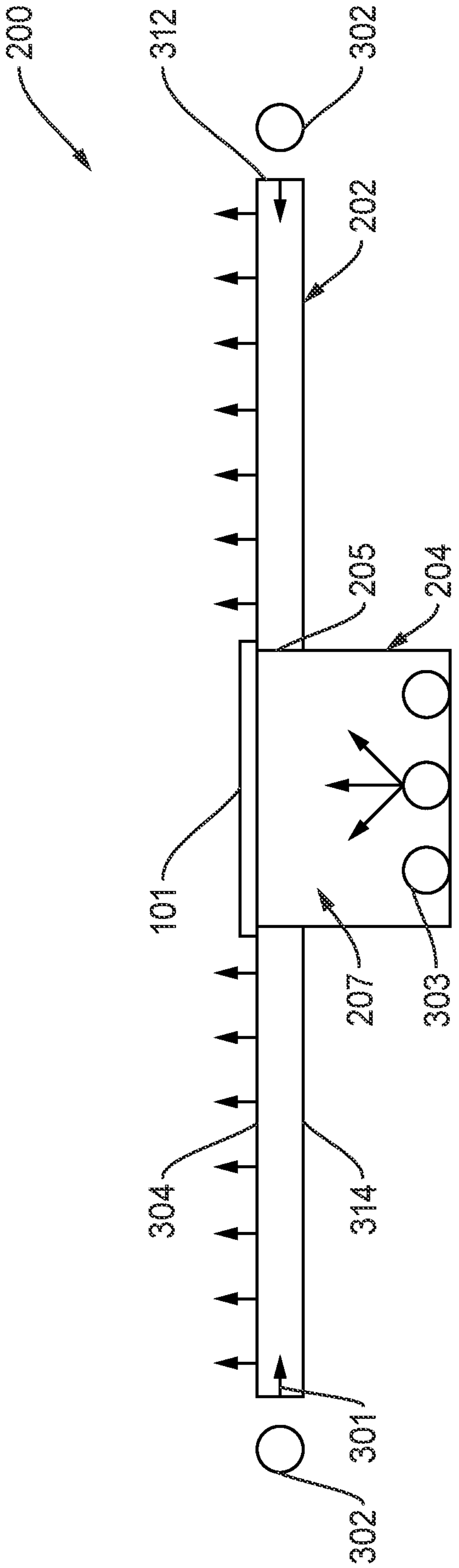
FIG. 4 illustrates a cross-sectional view of a lighting system according to the disclosed embodiments, in which a color-tunable light emitting panel is an edge-lit panel.

FIG. 4 illustrates a cross-sectional view of lighting system 200 according to the disclosed embodiments, in which color-tunable light emitting panel 202 is an edge-lit panel. In FIG. 4, tunable white light engine 204 includes a tunable white light source 303 with adjustable correlated color temperature (CCT) for simulating direct sunlight throughout the day. The tunable light source is configured by using multiple controllable channels of white LEDs to adjust the color temperature of the white light output in the range from 1900 K to 6500 K. The channels in a tunable white light source may all produce white light, but with varying color temperatures, or combination with one channel of amber LEDs. The tunable light source 303 may be construed by different combinations of multi-channel colored LEDs.

In one embodiment, a 2-channel white LED array may be employed in light engine 204. A two-color LED array will have multiple LEDs of a first color temperature (warm white) and multiple LEDs of a second color temperature (cool white). The white LEDs of the first channel that emit white light have a color temperature of approximately 2700K within five MacAdams ellipses of the Black Body Curve. The white LEDs of the second channel that emit white light have a color temperature of approximately 6500K within five MacAdams ellipses of the Black Body curve.

In another embodiment, a 3-channel (three-color LED array) is configured. An array of greenish white LEDs with peak wavelength around 550 nm (which may range from about 505 nm to about 550 nm), a plurality of cool white LEDs have a color temperature of approximately 6500K within five MacAdams ellipses of the Black Body Curve, and a third amber LEDs with a peak wavelength of about 625 nm added to the mix would expand the gamut enough to fully encompass the Black Body Curve over the desired range.

Figure 11:
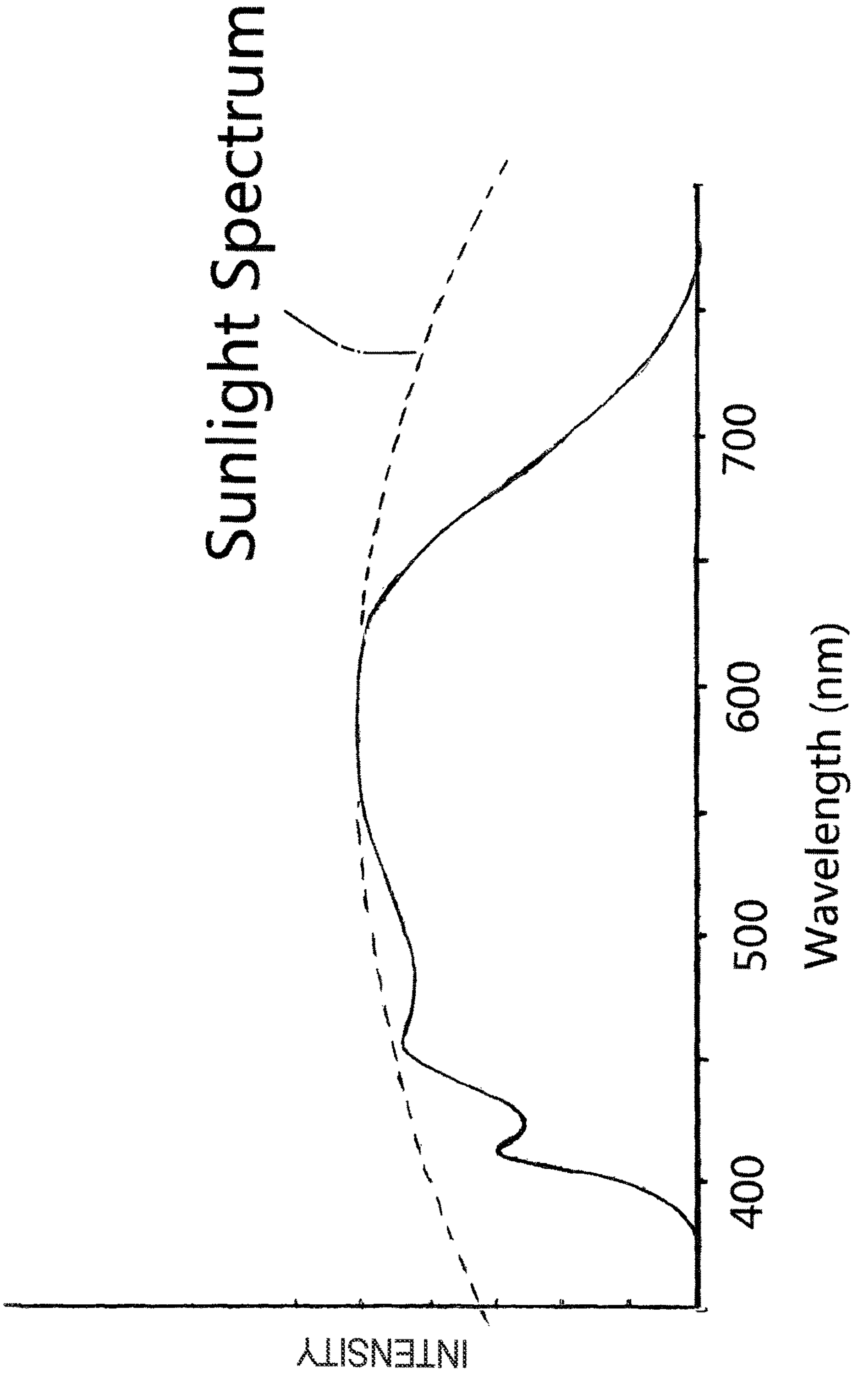
FIG. 11 is a plot of an example spectral profile for a white-light light emitting diode.

Further, a sunlight spectrum may have wavelengths between 400 nm to 1400 nm, as shown FIG. 11, which illustrates an exemplary spectral profile of a white-light light emitting diode in comparison with the sunlight spectrum. Studies show that a device with a spectrum similar to that of sunlight can improve human productivity, general health, and well-being. According to the disclosed embodiments, the tunable white light source 303 is configured with adjustable correlated color temperature (CCT) for simulating direct sunlight throughout the day. Therefore, the color temperature of the white light output of the tunable white light source 303 is in the range from 1900 K to 6500 K and the white light output has a spectral range between 400 nm and 1400 nm.

Tunable white light engine 204 is inserted into aperture 205 from the back side of light emitting panel 202 and optical element 101 is attached on the front surface of light engine 204 as a light emitting surface. Multiple controllable channels of white LEDs of tunable white light source 303 are arranged in optical cavity 207 of light engine 204 and emit light to the light emitting surface 101.

As color tunable light emitting panel 202 is an edge-lit style, the light emitting panel 202 includes a plurality of LEDs 302 around edges of a light-guide 301. The plurality of LEDs 302 work as light sources to the color tunable light emitting panel 202. Color tunable light emitting panel 202 further comprises a light output window (light out-coupling structures) 304 on a front side (or a top side) of light emitting panel 202, a light input window 312 adjacent to LEDs 302, and a reflective surface or reflector 314 on the back side (or a bottom side) of light emitting panel 202. The light-guide receives light from the plurality of LEDs 302 via the light input window 312, which propagates in guided-mode inside the guide 301. The plurality of LEDs 302 may be, for example, a linear stripe of color tunable RGB or RGBA or RGBW LEDs. The LEDs 302 can be individually varied in output to create the desired color, intensity and pattern. The light-guide may be made of a light transmitting material such as, for example, glass or Silicone or PC.

Out-coupling structure (i.e., the light output window) 304 may, for example, have a rough surface or may be formed by applying a diffusely reflective paint on a surface of the light-guide 301, so that the light received from light-guide 301 can be uniformly distributed along the surface of the light output window 304. In an alternative embodiment, the surface of light output window 304 may be imprinted with surface microstructures, such as dot patterns for diffusing the light received from the light-guide 301.

In another alternative embodiment, the out-coupling structure 304 together with reflector 314 may be implemented on the back surface of light-guide 301. In this case, the lighting system 200 further include a diffusing film attached to the front surface of the color-tunable light emitting panel 202.

In yet another alternative embodiment, a linear stripe of color tunable RGB or RGBA or RGBW LEDs may be further arranged adjacent the tunable white light engine 204, attaching to an inner edge of the light-guide 301.

Furthermore, the color-tunable light emitting panel 202 may be made of OLED (organic LED). The OLED panel is capable of generating a diffused light with controlled color, intensity and pattern.

Figure 5:
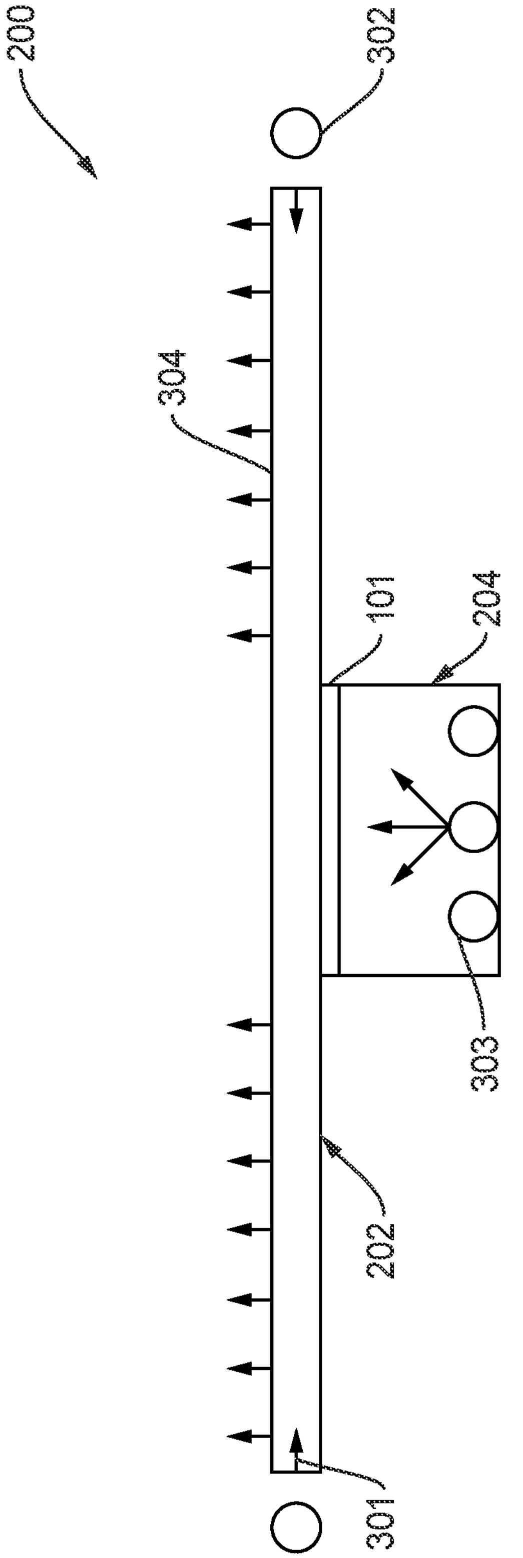
FIG. 5 illustrates a cross-sectional view of a lighting system that is an alternative embodiments of FIG. 4.
Figure 6:
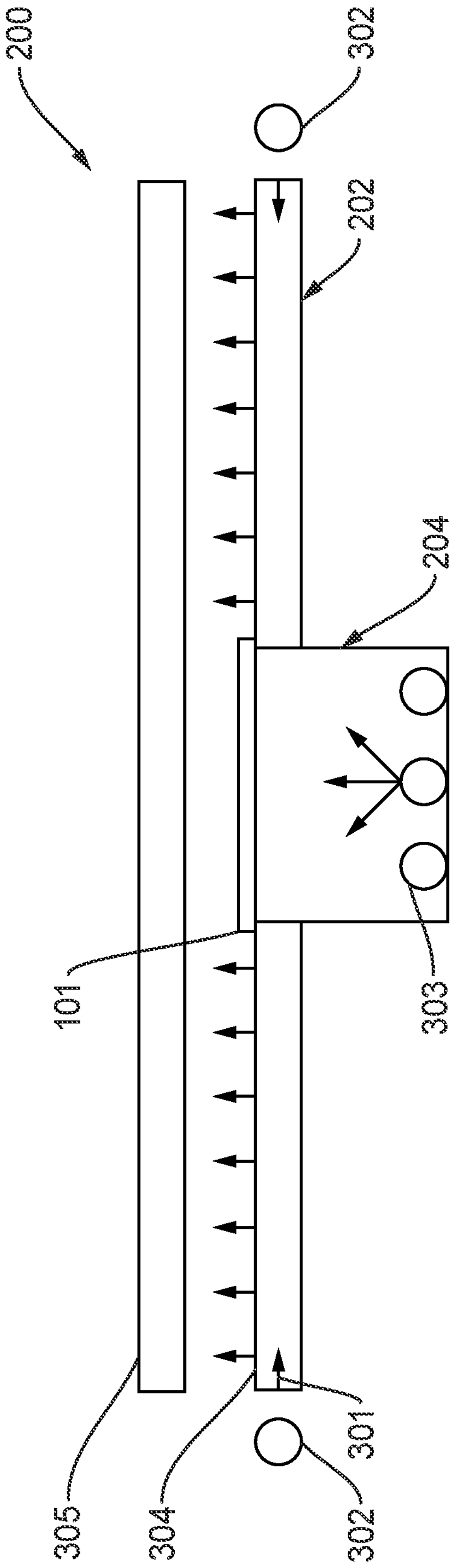
FIG. 6 illustrates another alternative embodiment of lighting system according to the disclosed embodiments.

FIGS. 5-6 show alternative embodiments of lighting system 200 of FIG. 4 which includes an edge-lit color-tunable light emitting panel 202. In FIG. 4, tunable white light engine 204 are inserted in aperture 205 on the back surface of color-tunable light emitting panel 202. In FIG. 5, however, tunable white light engine 204 with an optical element 101 is placed behind light-guide 301. In this case, a smooth surface region of the back of light-guide 303 faces the tunable white light source 303.

FIG. 6 illustrates another alternative embodiment of lighting system 200. In accordance with the disclosed embodiments, a single diffuser 305 is disposed adjacent the front surface of color-tunable light emitting panel 202 and is used for both light engine 204 and light emitting panel 202 to diffuse light emitted from light source 302 of light emitting panel 202 and light emitted from light source 303 of light engine 204. Optical element 101 may be optional in this alternative embodiment.

Diffuser 305 may be a volumetric element or the surface of diffuser 305 may be made roughen or be applied with a diffusely reflective paint so as to output diffuse light. The surface corresponding to the surface of light-guide 301 may also be imprinted with surface microstructures, such as dot patterns for extracting the light received from the lightguide 301.

Diffuser 305 may also function as optical element 101. Thus, the surface of diffuser 305 corresponding to the light engine 204 may have similar microstructures as in optical element 101, such as those shown in FIG. 2, in order to simulate the natural sunlight.

The structure of diffuser 305 described above is for exemplary purpose only and is not limited thereto. Any combinations of microstructures and materials to achieve the diffusing functions of the disclosed embodiments are within the scope of the present invention.

Figure 7:
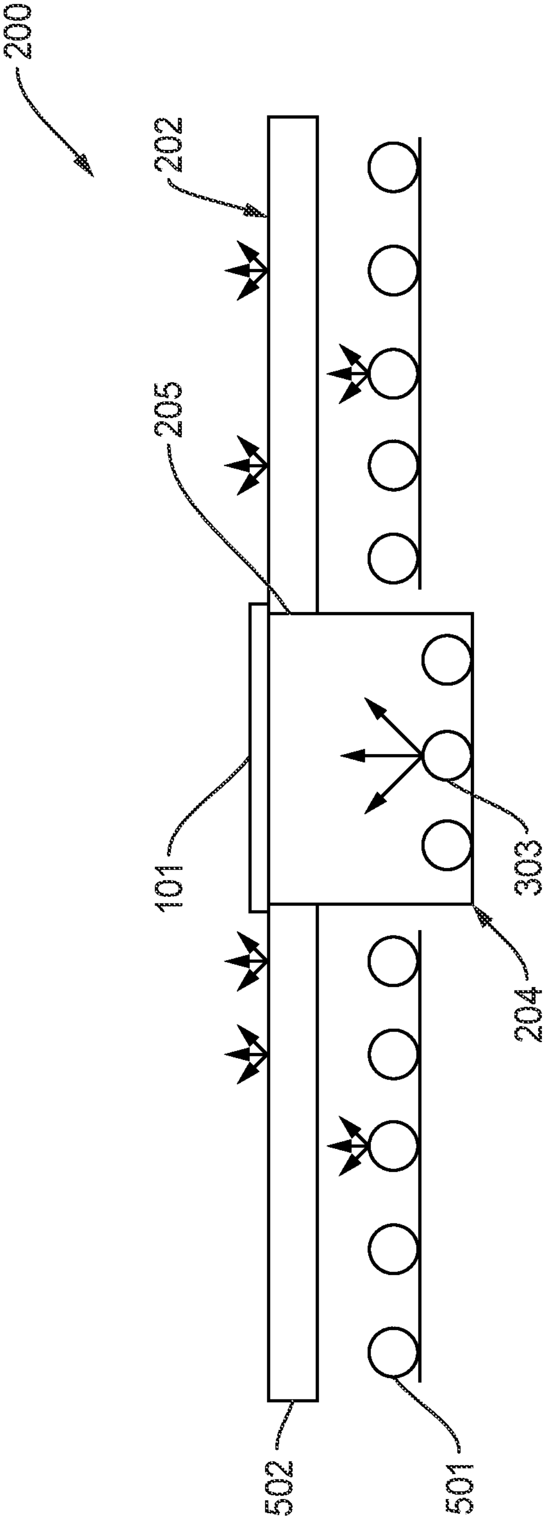
FIG. 7 illustrates a cross-sectional view of a lighting system in accordance with another alternative embodiments that includes a back-lit-type color-tunable light emitting panel.

FIG. 7 illustrates a cross-sectional view of lighting system 200 in accordance with other alternative embodiments. In FIG. 7, color-tunable light emitting panel 202 is a back-lit style panel. A plurality of LEDs 501, such as RGB or RGBA or RGBW LEDs, are arranged behind a diffuser 502. The diffuser 502 forms a light emitting surface. No light-guide is needed for light emitting panel in the back-lit style. Tunable white light engine 204 with optical element 101 on the front is inserted into aperture 205. The tunable white light engine 204 and optical element 101 have the same functions and structures as those of FIG. 4, and thus, the descriptions of these elements are omitted for brevity.

Diffuser 502 is used to obtain a relatively uniform light emission and to prevent hot spots from being visible to the viewers. The features of diffuser 502 are mentioned above and the descriptions of diffuse 502 is omitted for brevity.

Figure 8:
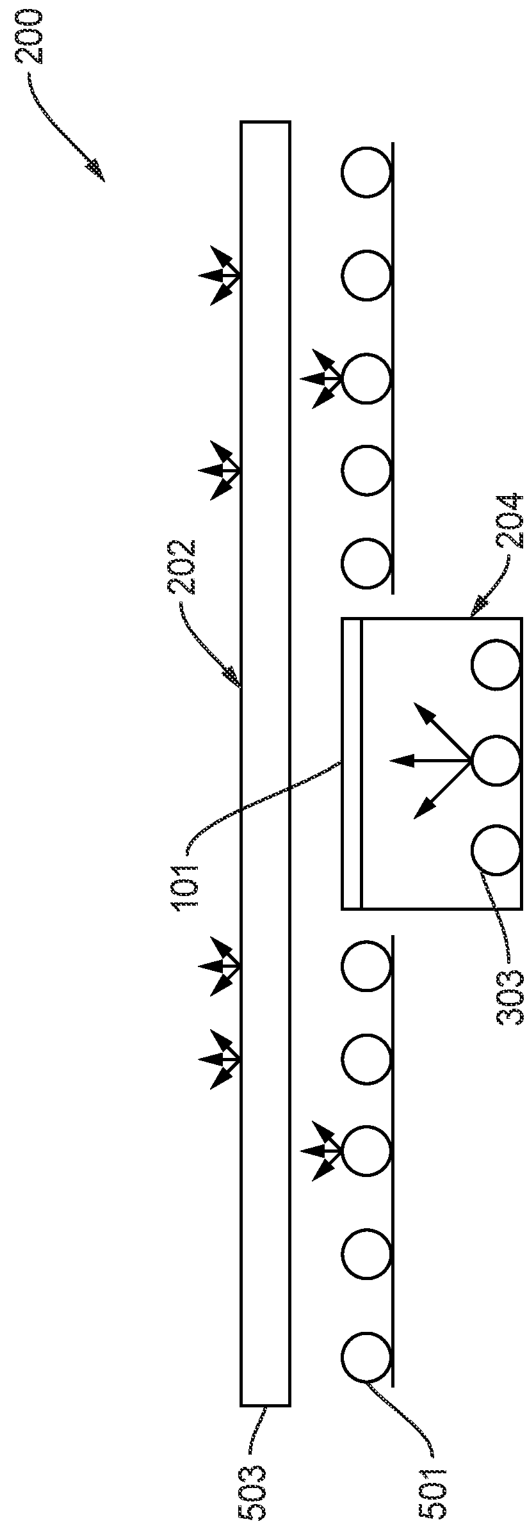
FIG. 8 illustrates a cross-sectional view of a light system that is an alternative embodiment of FIG. 7.

Light system 200 of FIG. 8 is similar to that of FIG. 7, but includes a single diffuser 503 used for color-tunable light emitting panel 202 and tunable white light engine 204. The features of single diffuser 503 is similar to diffuser 305 of FIG. 6, and thus, the description of diffuser 503 is omitted for brevity.

Figure 9:
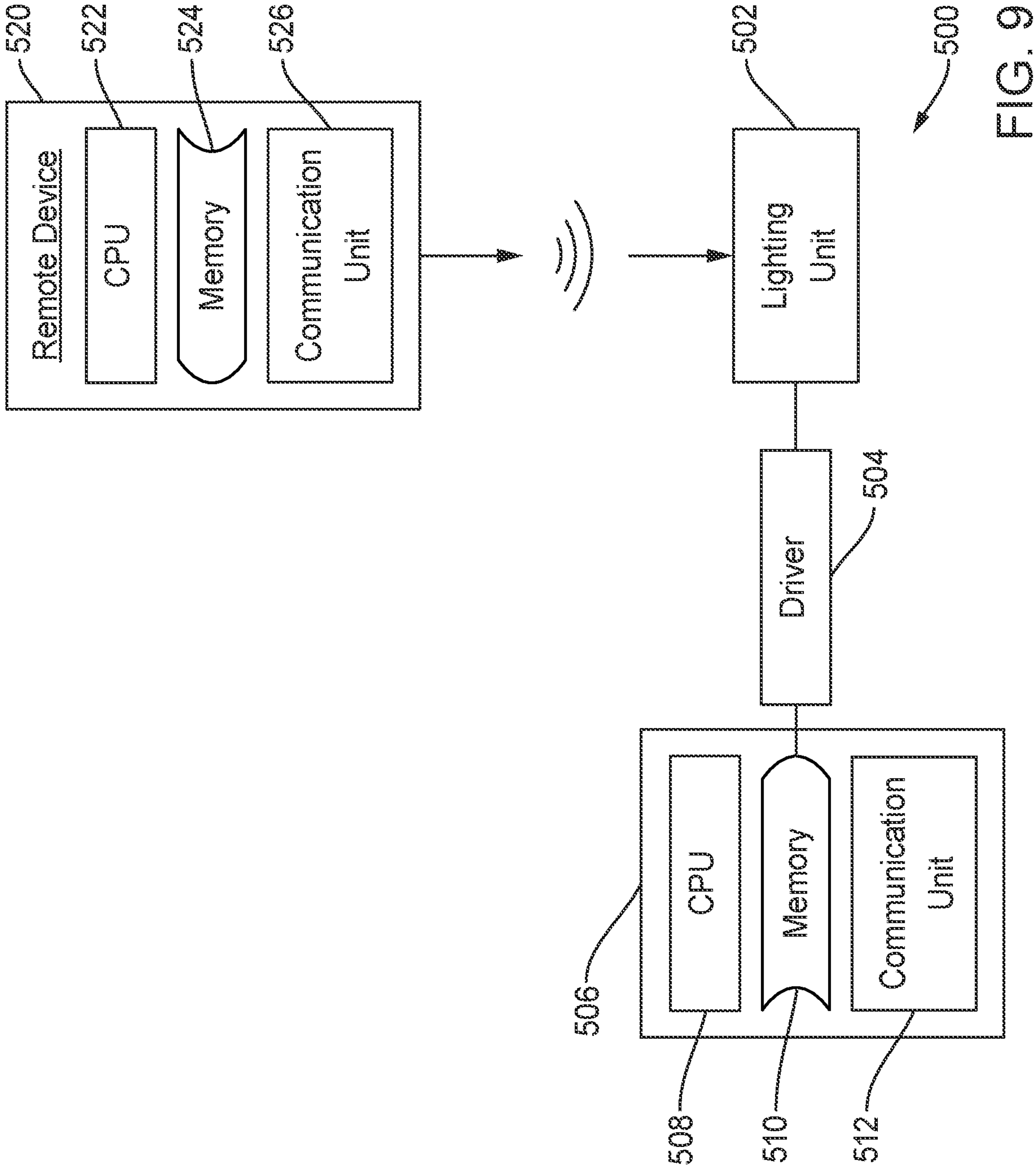
FIG. 9 illustrates a schematic diagram of an LED luminaire according to the disclosed embodiments.

FIG. 9 illustrates a schematic diagram of a LED luminaire 500 according to the disclosed embodiments. As shown in the figure, LED luminaire 500 is capable of providing wireless communications with remote device 520.

LED luminaire 500 in accordance with the disclosed embodiments includes a lighting unit 502 consisting of LED-based light emitting elements, such as any one of lighting systems 200 or light engines 204 disclosed in FIGS. 3-8, an LED driver 504 for driving light engine 204 to distribute light and to connect to a branch circuit (not shown), and a controlling device 506. Controlling device 506 comprises a CPU 508, e.g., a microprocessor or micro-controller, a memory 510 for storing data and software executable by CPU 508 to control operations of light unit 502, and a communication unit 512 for transmitting and receiving signals to/from a remote device, such as remote device 520. Controlling device 506 may be an embedded computing device with built-in wired or wireless communications capability. The embedded computing device can be any type of dedicated computer or processor to receive input from a wired or wireless module and provide control signals to other modules and driver.

Remote device 520 may be a personal computer or a smart phone or the like, which includes a CPU 522, a memory 524 for storing software executable by CPU 522 to control the operation of remote device 520, and a communication unit 526 for communicating with communication unit 512 of controlling device 506. Remote device 520 can communicate with controlling device 506 and to give commands to controlling device 506 to turn on/off LED luminaire 500, to change the time zone or regions LED luminaire 500 represents, to obtain a natural sunlight with different colors and temperatures, and so on, as desired.

Figure 10:
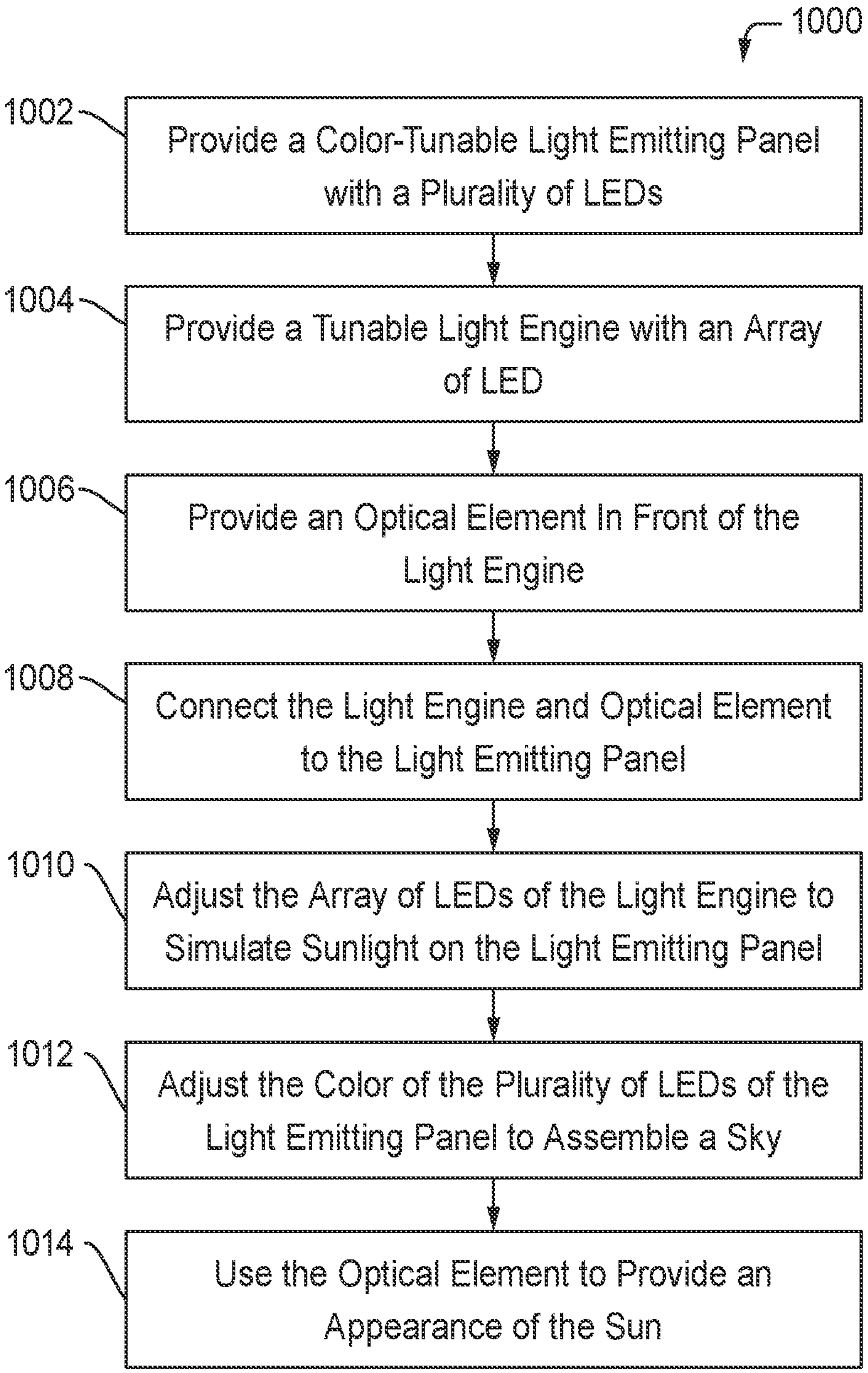
FIG. 10 illustrates a flowchart showing a method for simulating a natural sunlight in accordance with the disclosed embodiments.

FIG. 10 illustrates a flowchart 1000 for simulating a natural sunlight using a lighting unit according to the disclosed embodiment. The light unit can be any lighting system 200 disclosed in FIGS. 1-10.

Flowchart 1000 begins with providing a color-tunable light emitting panel with a plurality of LEDs, at step 1002. Based on the type of the panel, the plurality of LEDs may be disposed on edge regions of the panel (edge-lit type) or on the back of the panel (back-lit type). The plurality of LEDs may be RGB or RGBA or RGBW LEDs that that can be individually varied in output to create the desired color, intensity, and pattern.

At step 1004, a tunable white light engine is prepared and at least one array of LEDs are disposed in an optical cavity of the light engine. The array of LEDs may be color temperature adjustable to simulate direct sunlight through the day. The array of LEDs work as a tunable white light source. In one embodiment, the tunable white light source is configured by using multiple controllable channels of white LEDs to adjust the color temperature of the white light output in the range from 1900 K to 6500 K. The channels in a tunable white light source may all produce white light, but with varying color temperatures, or combination with one channel of amber LEDs.

Step 1006 executes by providing an optical element in front of the tunable white light engine. The optical element may has the same microstructures as shown in FIG. 2. The optical element forms a light emitting surface. The optical element also works as a diffuser.

Step 1008 executes by connecting the light engine with the optical element to the light emitting panel. The light engine may be inserted into an aperture of the light emitting panel or mounted to the aperture.

Step 1010 executes by adjusting the array of LEDs of the light engine to produce a simulated sunlight. The tunable white light engine is positioned relative to the color-tunable light emitting panel to produce simulated sunlight.

Step 1012 executes by adjusting the plurality of color-tunable LEDs of the light emitting panel to produce a simulated sky. This step can be done by adjusting the color, intensity, and pattern of the plurality of LEDs.

Finally, step 1014 executes by producing an appearance of the sun by connecting the optical element in front of the light engine. As described in FIG. 2, the optical element comprises unique microstructures imprinted on a transparent substrate. Therefore, when the optical element is placed in front of the light engine, the unique microstructures formed on a center region of the optical element can diffuse the light emitted from the light engine to provide uniform light distribution in the center; while the microstructures formed on an outer region of the optical element acting as two-dimensional gratings to provide the appearance of the sun.

After steps 1002-1014, a simulated natural sunlight will be produced on the light emitting panel.

In accordance with the disclosed embodiments, the lighting systems and luminaires not only reproduce natural sunlight at indoor places throughout the day, but also have the capabilities to change the color and temperature of the sunlight based on the time of day and the day of the year, as desired. The lighting system and luminaires have the benefit of natural sunlight without any harmful ultraviolet radiation.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computing system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more content management systems coupled to a network capable of exchanging information and data. Various functions and components of the content management system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for simulating sunny sky scenes throughout a day, the method comprising:

providing a color-tunable light emitting panel resembling the sky with a light engine;

producing sunlight with a tunable white light engine positioned relative to the color-tunable light emitting panel;

providing the appearance of the sun using an optical element coupled to a front of the tunable white light engine, wherein the optical element includes an inner region having dots arranged on a first substrate in a random distribution and an outer region in rows and columns separated by constant pitches to form two-dimensional gratings that diffract the light from an array of second LEDs.

2. The method of claim 1, wherein the tunable white light engine comprises a plurality of light emitters arranged inside an optical cavity, wherein the plurality of light emitter is a tunable white light source, and the tunable white light source has adjustable correlated color temperature of the white light output in the range from 1900 K to 6500 K.

3. The method of claim 1, wherein a plurality of first multi-color LEDs are disposed in one of an edge-lit type and back-lit type, the plurality of multi-colored LEDs are RGB or RGBA or RGBW light emitting diodes, and wherein the light emitting diodes can be individually varied in output to create a desired color, a desired intensity and a desired pattern.

4. The method of claim 1, wherein the tunable white light engine comprises multiple controllable channels of light emitters arranged inside an optical cavity to produce light, wherein the controllable channels of light emitters work as a tunable white light source, and the tunable white light source has adjustable correlated color temperature of the white light output in the range from 1900 K to 6500 K, and a spectral range of the white light output is between 400 nm and 1400 nm.

5. A lighting system for simulating sunny sky scenes, the lighting system comprising:

a color-tunable light emitting panel resembling the sky;

a tunable white light engine resembling the sun, positioned inside an aperture in the color-tunable light emitting panel; and an optical element positioned in front of the tunable white light engine, wherein the optical element comprises a microstructure formed on top of or in a transparent substrate or substrates to provide the appearance of the sun, wherein the optical element includes an inner region, wherein a plurality of dots are formed on the inner region and are arranged on a transparent substrate or substrates in a random distribution, and an outer region, wherein a plurality of dots are formed on the outer region and are arranged in rows and columns separated by constant pitches, and wherein the plurality dots formed on the outer region form two-dimensional gratings to provide the appearance of the sun.

6. The lighting system of claim 5, wherein the tunable white light engine comprises a plurality of light emitters arranged inside an optical cavity, wherein the plurality of light emitter forms a tunable white light source, and wherein the tunable white light source has adjustable color temperature of the white light output in the range from 1900 K to 6500 K.

7. The lighting system of claim 5, wherein the optical element is a diffuser with diffusing properties thereof being uniform across a full surface of the diffuser.

8. The lighting system of claim 5, wherein the tunable white light engine comprises multiple controllable channels of light emitters arranged inside an optical cavity to produce light such that the tunable white light source has adjustable color temperature of the white light output in the range from 1900 K to 6500 K, and a spectral range of the white light output is between 400 nm and 1400 nm.

9. The lighting system of claim 5, wherein the color-tunable light emitting panel includes light out-coupling structures and a reflector on a back side thereof to provide an edge lit light-guide, wherein the light-guide is edge-lit by the plurality of first multi-colored LEDs, and wherein the plurality of multi-colored LEDs are RGB or RGBA or RGBW light emitting diodes, and can be individually varied in output to create a desired color, a desired intensity and a desired pattern.

10. The lighting system of claim 5, wherein the color tunable light emitting panel comprises a diffuser as a light emitting surface and a plurality of second multi-colored LEDs are positioned behind the diffuser, wherein the plurality of second light emitting diodes are RGB or RGBA or RGBW light emitting diodes, and can be individually varied in output to create the desired color, intensity and pattern.

* * * * *